United States Patent
Ohsugi et al.

(10) Patent No.: US 12,485,907 B2
(45) Date of Patent: Dec. 2, 2025

(54) CONTROL SYSTEM

(71) Applicant: TOYOTA JIDOSHA KABUSHIKI KAISHA, Toyota (JP)

(72) Inventors: Masamichi Ohsugi, Shizuoka-ken (JP); Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 18/763,368

(22) Filed: Jul. 3, 2024

(65) Prior Publication Data
US 2025/0018958 A1    Jan. 16, 2025

(30) Foreign Application Priority Data
Jul. 10, 2023 (JP) ................. 2023-113021

(51) Int. Cl.
*B60W 50/00* (2006.01)
*G07C 5/08* (2006.01)

(52) U.S. Cl.
CPC ......... *B60W 50/0098* (2013.01); *G07C 5/085* (2013.01)

(58) Field of Classification Search
CPC ..... B60W 50/0098; B60W 2050/0095; B60W 2540/229; B60W 2552/05; B60W 30/182; B60W 50/029; B60W 60/00186; B60W 2050/0292; G07C 5/085; G07C 5/0841
See application file for complete search history.

(56) References Cited

U.S. PATENT DOCUMENTS

| | | | |
|---|---|---|---|
| 10,322,747 B2 * | 6/2019 | Fujimoto | B62D 5/04 |
| 11,275,374 B2 * | 3/2022 | Levinson | G01S 15/931 |
| 2001/0056544 A1 * | 12/2001 | Walker | B60R 25/102 |
| | | | 180/170 |
| 2016/0247153 A1 * | 8/2016 | Lesesky | G06Q 20/405 |
| 2018/0218758 A1 | 8/2018 | Maeda | |
| 2020/0302233 A1 * | 9/2020 | Iwasaki | G06V 10/774 |
| 2023/0154244 A1 * | 5/2023 | Fang | G07C 5/0841 |
| | | | 701/23 |
| 2025/0018958 A1 * | 1/2025 | Ohsugi | B60W 30/182 |

(Continued)

FOREIGN PATENT DOCUMENTS

| | | | | |
|---|---|---|---|---|
| CN | 117644880 A | * | 3/2024 | B60W 50/0098 |
| DE | 102022208181 A1 | * | 7/2023 | H04L 67/12 |
| EP | 3546308 A1 | * | 10/2019 | G07C 5/0866 |

(Continued)

OTHER PUBLICATIONS

EP-3546308-A1 translation (Year: 2019).*

(Continued)

*Primary Examiner* — Kyle T Johnson
(74) *Attorney, Agent, or Firm* — Dinsmore & Shohl LLP (57) ABSTRACT

A control system comprises one or more processors configured to perform vehicle control of a vehicle including a plurality of control functions and one or more storage devices. The control system stores log data related to the vehicle control in the one or more storage devices while performing the vehicle control. When a free capacity of the one or more storage devices is less than a threshold value, the control system restricts operation of one or more target control functions selected from the plurality of control functions.

2 Claims, 5 Drawing Sheets

(56) References Cited

U.S. PATENT DOCUMENTS

2025/0018973 A1\* 1/2025 Ohsugi ................ B60W 50/06

FOREIGN PATENT DOCUMENTS

| JP | 2018-124823 A | 8/2018 | | |
|---|---|---|---|---|
| JP | 2019-040364 A | 3/2019 | | |
| JP | 2025010940 A | \* 1/2025 | ......... | G01C 21/3453 |
| WO | 2019/116423 A1 | 6/2019 | | |

OTHER PUBLICATIONS

CN-117644880-A translation (Year: 2024).\*
DE-102022208181-A1 translation (Year: 2023).\*
JP-2025010940-A translation (Year: 2025).\*

\* cited by examiner

CONTROL SYSTEM

CROSS-REFERENCE TO RELATED APPLICATION

The present disclosure claims priority to Japanese Patent Application No. 2023-113021, filed on Jul. 10, 2023, the contents of which application are incorporated herein by reference in their entirety.

TECHNICAL FIELD

The present disclosure relates to a control system installed on a vehicle.

BACKGROUND ART

Recent years, a technique of performing vehicle control by using a machine learning model is considered. Patent Literature 1: Closes, regarding automated driving control using a machine learning model, a method for collecting training data that can be used for training of the machine learning model. In addition, the following Patent Literatures 2 and 3 are documents showing the technical level of the present technical field.

LIST OF RELATED ART

Patent Literature 1: WO 2019116423 A1
Patent Literature 2: JP 2018124823 A
Patent Literature 3: JP 2019040364 A

SUMMARY

In a control system that performs vehicle control, it may require ex-post facto assessment of the vehicle control. As a method for ex-post facto assessment of vehicle control, it is containable to store log data related to the vehicle control in an in-vehicle storage device. However, since the capacity of the in-vehicle storage device is limited, the capacity may be strained depending on the situation. In particular, when a machine learning model is used for vehicle control, the amount of log data to be stored is expected to be large. If the capacity of the storage device is strained, there is a possibility that necessary log data will not be able to be recorded.

An object of the present disclosure is, in view of the above problems, to provide a technique capable of suppressing the capacity of a storage device from being strained.

One aspect of the present disclosure is directed to a control system.

The control system comprises:
 one or more processors configured to perform vehicle control of a vehicle including a plurality of control functions; and
 one or more storage devices.

The one or more processors are further configured to execute:
 storing log data related to the vehicle control in the one or more storage devices while performing the vehicle control; and
 when a free capacity of the one or more storage devices is less than a threshold value, restricting operation of one or more target control functions selected from the plurality of control functions.

According to the present disclosure, when the free capacity of the storage device is less than the threshold value, the operation of the one or more target control functions selected from the plurality of control functions is restricted. Thereby, it is possible to reduce the amount of log data to be stored. As a result, it is possible to suppress the capacity of the storage device from being strained.

DETAILED DESCRIPTION

Hereinafter, embodiments will be described with reference to the drawings.

1. Automated Driving System

Figure 1:
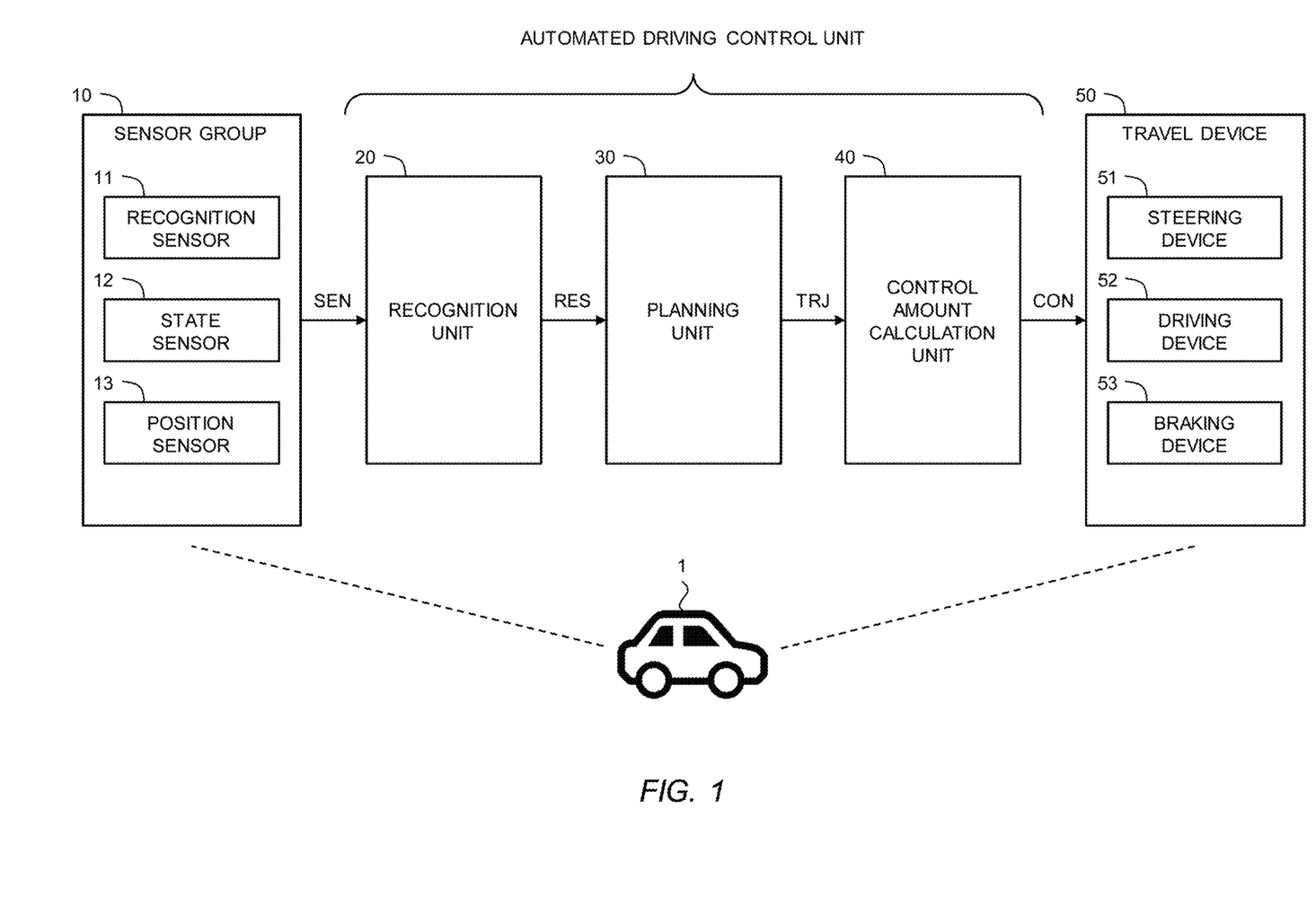
FIG. 1 is a diagram showing an example of a configuration related to automated driving control of a vehicle according to the present embodiment.

The present embodiment relates to an automated driving system that performs automated driving control of a vehicle. FIG. 1 is a diagram showing an example of a configuration related to automated driving control of a vehicle 1 by an automated driving system according to the present embodiment. The automated driving is to automatically perform at least one of steering, acceleration, and deceleration of the vehicle 1 without depending on a driving operation performed by an operator. The automated driving control is a concept including not only complete automated driving control but also risk avoidance control, lane keep assist control, and the like. The operator may be a driver on board the vehicle 1 or may be a remote operator who remotely operates the vehicle 1.

The vehicle 1 includes a sensor group 10, a recognition unit 20, a planning unit 30, a control amount calculation unit 40, and a travel device 50.

The sensor group 10 includes a recognition sensor 11 used for recognizing a situation around the vehicle 1. Examples of the recognition sensor 11 include a camera, a laser imaging detection and ranging (LIDAR), a radar, and the like. The sensor group 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, a steering angle sensor, and the like. As the position sensor 13, a global navigation satellite system (GNSS) sensor is exemplified.

Sensor detection information SEN is information acquired by the use of the sensor group 10. For example, the sensor detection information SEN includes image data captured (taken) by the camera. Alternatively, the sensor detection information SEN may include information (e.g., relative position, relative velocity, shape, and the like) regarding a specific object appearing in the image (e.g., a pedestrian, a preceding vehicle, a white line, a bicycle, a road sign, and the like). Also, for example, the sensor detection information SEN may include point group data acquired by the LIDAR. Also, for example, the sensor detection information SEN may include information on a relative position and a relative velocity of objects detected by the radar. The sensor detection information SEN may include vehicle state information indicating the state of the vehicle 1. The sensor detection information SEN may include position information indicating the position of the vehicle 1.

The recognition unit 20 receives the sensor detection information SEN. The recognition unit 20 recognizes a situation around the vehicle 1 based on the information acquired by the recognition sensor 11. For example, the recognition unit 20 recognizes the position of an object around the vehicle 1 on the special map. Examples of the object include a pedestrian, another vehicle (e.g., a preceding vehicle, a parked vehicle, and the like), a white line, a road structure (e.g., a guard rail, a curb, and the like), a fallen object, a traffic light, an intersection, a sign, and the like. Furthermore, the recognition unit 20 may perform prediction of the behavior of an object around the vehicle 1. Recognition result information RES indicates a result of recognition by the recognition unit 20.

The planning unit 30 receives the recognition result information RES from the recognition unit 20. In addition, the planning unit 30 may receive the vehicle state information, the position information, and map information generated in advance. The map information may be high-precision three-dimensional map information. The planning unit 30 generates a travel plan of the vehicle 1 based on the received information. The travel plan may be one for arriving at a destination set in advance. The travel plan may be one for avoiding a risk. The travel plan provides driving decisions such as, for example, maintaining a current travel lane, making a lane change, overtaking, making a right or left turn, steering, accelerating, decelerating, stopping, and the like. Further, the planning unit 30 generates a target trajectory TRJ required for the vehicle 1 to travel in accordance with the travel plan. The target trajectory TRJ includes a target position and a target velocity.

The control amount calculation unit 40 receives the target trajectory TRJ from the planning unit 30. The control amount calculation unit 40 calculates a control amount CON required for the vehicle 1 to follow the target trajectory TRJ. It can be also said that the control amount CON is a control amount required for reducing a deviation of the vehicle 1 from the target trajectory TRJ. The control amount CON includes at least one of a steering control amount, a driving control amount, and a braking control amount. Examples of the steering control amount include a target steering angle, a target steering torque, a target motor angle, a target motor drive current, and the like. Examples of the driving control amount include a target driving force, a target engine torque, and the like. Examples of the braking control amount include a target braking force, a target braking torque, and the like.

The travel device 50 includes a steering device 51, a driving device 52, and a braking device 53. The steering device 51 steers wheels of the vehicle 1. For example, the steering device 51 includes an electric power steering (EPS) device. The driving device 52 is a power source that generates a driving force. Examples of the driving device 52 include an engine, an electric motor, an in-wheel motor, and the like. The braking device 53 generates a braking force. The travel device 50 receives the control amount CON from the control amount calculation unit 40. The travel device 50 operates the steering device 51, the driving device 52, and the braking device 53 in accordance with the steering control amount, the driving control amount, and the braking control amount, respectively. Thus, the vehicle 1 travels so as to follow the target trajectory TRJ.

The recognition unit 20 includes at least one of a rule-based model and a machine learning model. The rule-based model performs the recognition process based on a predetermined rule group. Examples of the machine learning model include a neural network (NN), a support vector machine (SVM), a regression model, a decision tree model, and the like. The NN may be a convolutional neural network (CNN), a recurrent neural network (RNN), or a combination of CNN and RNN. The type of each layer, the number of layers, and the number of nodes in the NN are arbitrary. The machine learning model is generated in advance through machine learning. The recognition unit 20 performs the recognition process by inputting the sensor detection information SEN into the model. The recognition result information RES is output from the model or generated based on the output from the model.

Similarly, the planning unit 30 also includes at least one of a rule-based model and a machine learning model. The planning unit 30 performs the planning process by inputting the recognition result information RES into the model. The target trajectory TRJ is output from the model or generated based on the output from the model.

Similarly, the control amount calculation unit 40 also includes at least one of a rule-based model and a machine learning model. The control amount calculation unit 40 performs the control amount calculation process by inputting the target trajectory TRJ into the model. The control amount CON is output from the model or generated based on the output from the model.

Two or more of the recognition unit 20, the planning unit 30, and the control amount calculation unit 40 may have an integrated architecture. All of the recognition unit 20, the planning unit 30, and the control amount calculation unit 40 may have an integrated architecture (End-to-End architecture). For example, the recognition unit 20 and the planning unit 30 may have an integrated architecture that generates and outputs the target trajectory TRJ directly from the sensor detection information SEN. Even in the case of the integrated architecture, intermediate products such as the recognition result information RES and the target trajectory TRJ may be output. For example, in a case where the recognition unit 20 and the planning unit 30 have an integrated architecture based on a NN, the recognition result information RES may be an output from an intermediate layer of the NN.

The recognition unit 20, the planning unit 30, and the control amount calculation unit 40 constitute an "automated driving control unit" that controls the automated driving of the vehicle 1. The automated driving control unit performs automated driving control of the vehicle 1 so as to realize a plurality of control functions. That is, the automated driving control by the automated driving control unit includes the plurality of control functions. For example, the plurality of control functions includes "cruise control", "lane keep", "lane change", "pre-crash safety", "risk avoidance control", "overtake low-speed vehicle", "road sign recognition and control according to recognition results", "traffic light recognition and control according to recognition results", and the like.

The automated driving control by the automated driving control unit can be performed in a variety of patterns depending on the control functions to be implemented. For example, the automated driving control unit in which all the control functions of the above example are implemented may be considered, or the automated driving control unit in which only cruise control and lane keep are implemented may be considered.

In the automated driving control unit, each of the recognition unit 20, the planning unit 30, and the control amount calculation unit 40 has a configuration corresponding to the control function to be implemented. For example, the rule-based model includes conditional statements or function expressions corresponding to the control function to be implemented. Also, for example, machine learning corresponding to the control function to be implemented is performed on the machine learning model.

Figure 2:
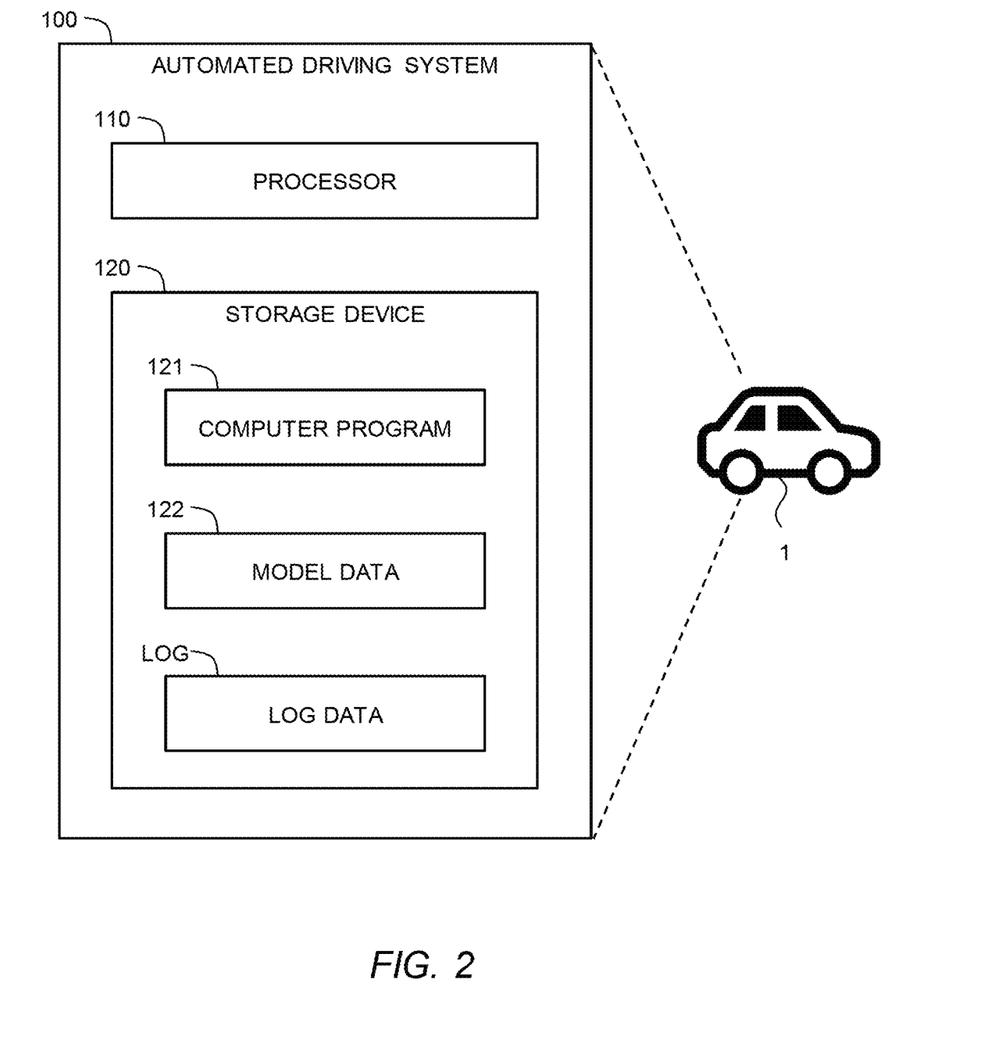
FIG. 2 is a diagram showing an example of a hardware configuration of an automated driving system according to the present embodiment.

FIG. 2 is a diagram showing an example of a hardware configuration of an automated driving system 100 according to the present embodiment. The automated driving system 100 has at least the function of the automated driving control unit described above. The automated driving system 100 may further include the sensor group 10 and the travel device 50.

The automated driving system 100 includes one or more processors 110 (hereinafter, simply referred to as a processor 110 or processing circuitry) and one or more storage devices 120 (hereinafter, simply referred to as a storage device 120).

The processor 110 executes a variety of processing. The processor 110 may be configured with a central processing unit (CPU), a graphics processing unit (GPU), an application specific integrated circuit (ASIC), a field-programmable gate array (FPGA), and the like. The recognition unit 20, the planning unit 30, and the control amount calculation unit 40 may be implemented by a single processor 110 or may be respectively implemented by separate processors 110. The storage device 120 stores a variety of information necessary for the processor 110 to execute processing. The storage device 120 may be configured with a read only memory (ROM), a random-access memory (RAM), a hard disk drive (HDD), a solid state drive (SSD), and the like.

The storage device 120 stores a computer program 121, model data 122, and log data LOG.

A computer program 121 is executed by the processor 110. The variety of processing by the automated driving system 100 may be implemented by a cooperation of the processor 110 executing the computer program 121 and the storage device 120. The computer program 121 may be recorded on a non-transitory computer-readable recording medium.

The model data 122 is data of a model included in the recognition unit 20, the planning unit 30, and the control amount calculation unit 40. When the processor 110 executes the processing related to the automated driving control, the processor 110 selects and uses a model from the model data 122 to configure the recognition unit 20, the planning unit 30, and the control amount calculation unit 40.

While performing the automated driving control, the processor 110 acquires "log data LOG" related to the automated driving control. the processor 110 stores the acquired log data LOG in the storage device 120. It is expected that the stored log data LOG is used for verification of the automated driving control. The log data LOG may include the sensor detection information SEN that is input to the automated driving control unit. The log data LOG may include the control amount CON that is output from the automated driving control unit. The log data LOG may include the recognition result information RES that is output from the recognition unit 20. The log data LOG may include the target trajectory TRJ that is output from the planning unit 30. The log data LOG may include a reason for determination in the recognition process performed by the recognition unit 20. The log data LOG may include a reason for determination in the planning process performed by the planning unit 30. The log data LOG may include presence or absence of an operator's intervention in the automated driving control.

The automated driving system 100 according to the present embodiment is configured to be able to change the contents of a plurality of control functions implemented in the automated driving control unit. In particular, the automated driving system 100 is configured to be able to restrict the operation of each control function. The restriction here includes not only turning off the operation of the control function but also reducing the operation frequency or the operation range of the control function, or reducing the content of the control function.

For example, when the automated driving control unit in which "cruise control", "lane keep", and "lane change" are implemented is configured, the automated driving system 100 may be configured to turn off the operation of "lane change" so that the automated driving control unit does not perform "lane change".

The processor 110 changes the contents of the plurality of control functions implemented in the automated driving control unit by switching the model selected from the model data 122, for example. Alternatively, the processor 110 may change the contents of the plurality of control functions implemented in the automated driving control unit by changing the parameters included in the model.

2. Restricting Operation of Control Function

As described above, in the automated driving system 100, the processor 110 stores the log data LOG related to the automated driving control in the storage device 120 for subsequent verification of the automated driving control. In order to appropriately verify the automated driving control in the event that some situation occurs, it is desirable that all stored log data LOG be retained until one process of autonomous driving is completed. However, the capacity of the storage device 120 provided in the vehicle 1 is limited. Therefore, the capacity may be strained depending on the situation of the automated driving control. If the capacity is strained, there is a possibility that necessary log data LOG will not be able to be recorded.

Therefore, in the automated driving system 100 according to the present embodiment, when the free capacity of the storage device 120 is less than a predetermined threshold value, the processor 110 restricts the operation of one or more control functions (hereinafter, referred to as "one or more target control functions") among the plurality of control functions implemented in the automated driving control unit.

The size of the data amount of the log data LOG collected while performing the automated driving control correlates with the content of the control function being operated. This is because data associated with the execution of the processing related to each control function is collected as log data LOG. In particular, the size of the data amount of the log data LOG to be collected is considered to increase as the number of control functions in operation increases and the content of the control functions in operation becomes more complex. Therefore, by restricting the operation of some of the plurality of control functions implemented in the automated driving control unit, it is possible to reduce the data amount of the log data LOG to be collected and stored. The automated driving system 100 according to the present embodiment can suppress the capacity of the storage device 120 from being strained based on the above viewpoint.

2-1. Processing

Figure 3:
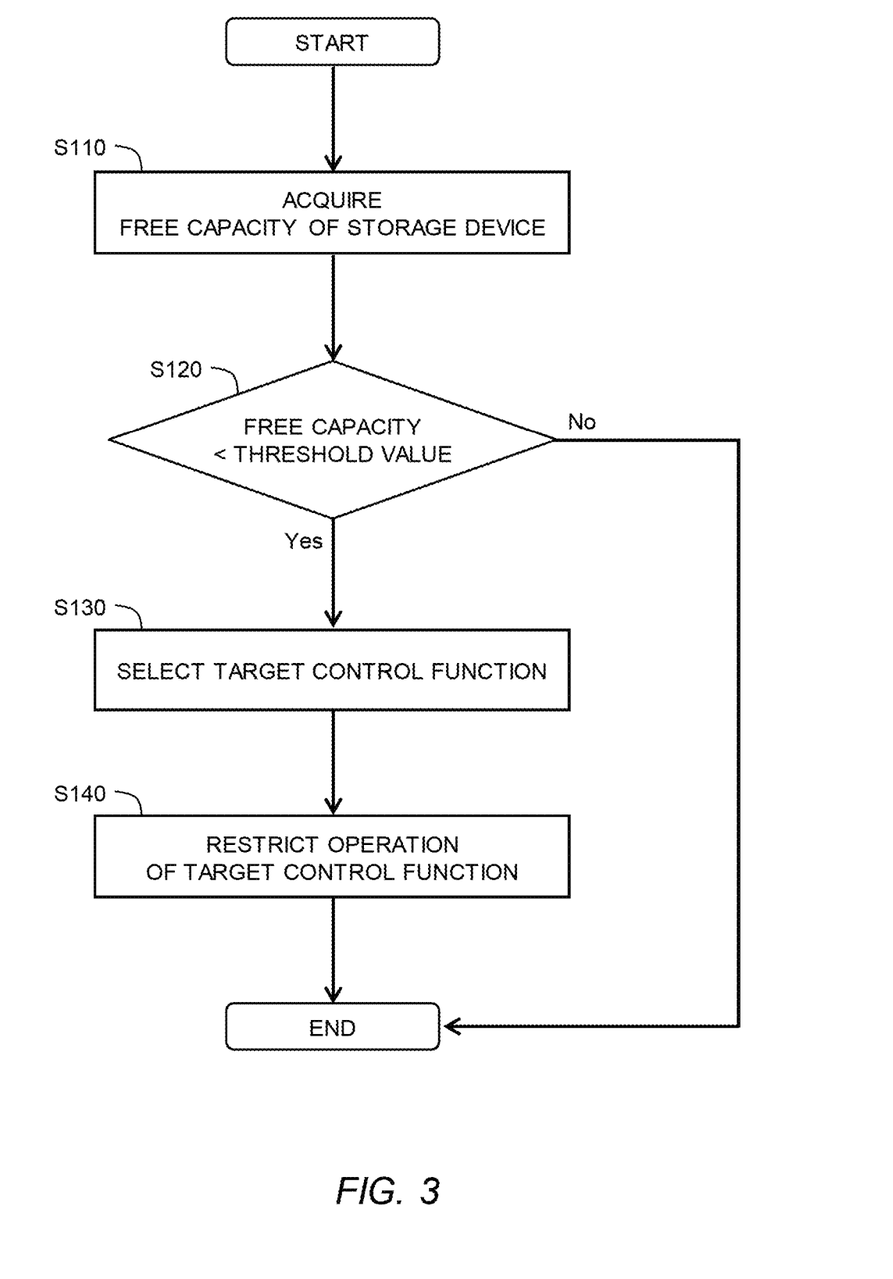
FIG. 3 is a flowchart showing processing executed by a processor according to the present embodiment.

FIG. 3 is a flowchart showing an example of processing executed by the processor 110 with respect to restricting the operation of one or more target control functions. The processing according to the flowchart shown in FIG. 3 is repeatedly executed at a predetermined processing cycle while performing the automated driving control, for example.

In step S110, the processor 110 acquires the free capacity of the storage device 120.

Next, in step S120, the processor 110 determines whether or not the free capacity of the storage device 120 is less than a predetermined threshold value. The threshold value may be set to, for example, a value at which it is expected that the log data LOG cannot be recorded during the travel to the destination. The processor 110 may be configured to change the threshold value depending on the expected traveling time or the traveling environment.

When the free capacity is equal to or greater than the threshold value (step S120; No), the processor 110 ends the current process without restricting the operation of the control function. When the free capacity is less than the threshold value (step S120; Yes), the processing proceeds to step S130.

In step S130, the processor 110 selects one or more target control functions from a plurality of control functions. Several embodiments of how to select the one or more target control functions can be considered from various viewpoints. Embodiments regarding the selection of the one or more target control functions will be described later.

Next, in step S140, the processor 110 restricts the selected one or more target control functions. For example, if "lane change" is selected as the one or more target control functions, the processor 110 turns off the operation of "lane change". Alternatively, the processor 110 reduces the operation frequency of the "lane change". Alternatively, the processor 110 reduces the function related to the determination of "lane change" so that control is started only when an operator decides to perform lane change (for example, when the operator operates a turn lamp). The processor 110 may be further configured to notify the operator that the one or more target control functions have been restricted.

By restricting the operation of the one or more target control functions in this way, it is possible to reduce the data amount of log data LOG associated with the execution of the processing related to one or more target control functions. For example, by restricting the operation of the one or more target control functions, it is possible to reduce the sensor detection information SEN and the recognition result information RES used in the automated driving control unit. Further, for example, it is possible to reduce information regarding the reason for the determination in the recognition process by the recognition unit 20 and the planning process by the planning unit 30.

2-2. Selection of Target Control Function

In the following, embodiments regarding the selection of the one or more target control functions will be described.

The first embodiment is to select the one or more target control functions based on the data amount of the log data LOG generated per unit time (hereinafter referred to as the "generated data amount") of each of the plurality of control functions implemented in an automated driving control unit. Typically, in the first embodiment, the processor 110 selects, from among the plurality of control functions, a control function with large generated data amount as one or more target control functions. The number of the one or more target control functions may be determined based on, for example, the desired amount of reduction in the generated data amount and the expected amount of reduction in the generated data amount by restricting operation.

Figure 4:
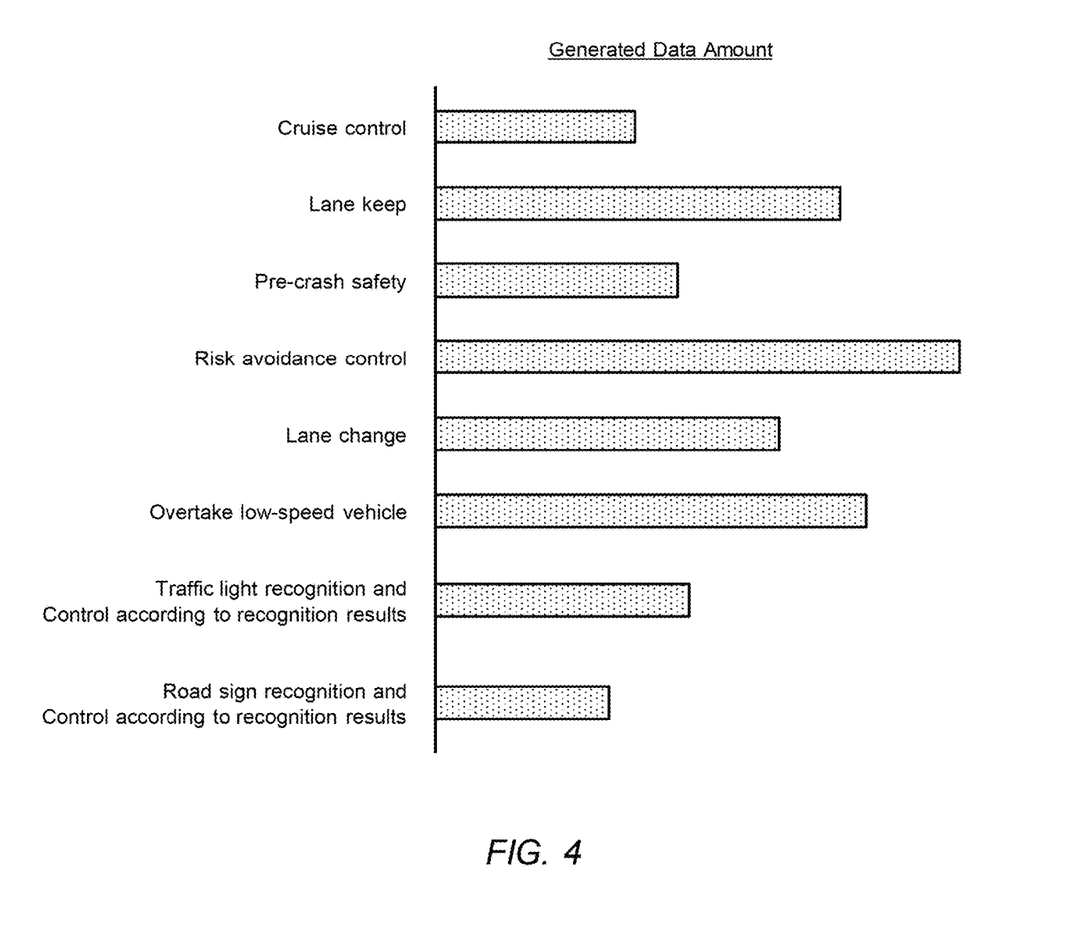
FIG. 4 is a diagram showing an example of generated data amount.

FIG. 4 is a diagram showing an example of the generated data amount. FIG. 4 shows a list of the plurality of control functions implemented in the automated driving control unit and a bar graph showing the size of the generated data amount of each control function. According to the first embodiment, for example, the processor 110 selects "risk avoidance control", "overtake low-speed vehicle", and "lane keep" as one or more target control functions, each of which has large generated data amount. In order to secure the function of the automated driving control at a certain level, a control function that is not selected as the one or more target control functions may be set regardless of the generated data amount. For example, "cruise control", "lane keep", and "pre-crash safety" are set as control functions that are not selected as the one or more target control functions. In this case, for example, the processor 110 selects "risk avoidance control", "overtake low-speed vehicle", and "lane change" as the one or more target control functions.

According to the first embodiment, the data amount of the log data LOG to be stored can be effectively reduced.

The second embodiment is to select one or more target control functions using the necessity in a traveling environment of the vehicle 1 as an indicator. The traveling environment of the vehicle 1 includes the type of road on which the vehicle 1 travels (e.g., whether the road is a general road or a limited-access highway), the number of lanes of the road on which the vehicle 1 travels, the number of objects around the vehicle 1, and the like.

In the second embodiment, the processor 110 selects, as the one or more target control functions, a control function determined to be less necessary for the traveling environment of the vehicle 1 among the plurality of control functions. For example, when the vehicle 1 is traveling on an expressway, it is considered that "risk avoidance control" and "traffic light recognition and control according to recognition results" are less necessary. Therefore, in this case, for example, the processor 110 selects "risk avoidance control" and "control according to the recognition and the recognition result" as the one or more target control functions. And, for example, when the vehicle 1 is traveling on a road with a single lane, "lane change" or "overtake low-speed vehicle" is considered to be less necessary. Therefore, in this case, for example, the processor 110 selects "lane change" and "overtake low-speed vehicle" as the one or more target control functions. The processor 110 may be configured to select the one or more target control functions using an array that defines control functions necessary for the travelling environment of the vehicle 1, for example.

According to the second embodiment, the data amount of the log data LOG can be reduced while maintaining the function of the automated driving control unit as much as possible.

The third embodiment is to select the one or more target control functions using the necessity in a driving characteristics of an operator of the vehicle 1 as an indicator. The driving characteristics of the operator include a tendency to be aware of the surroundings of the vehicle 1 (e.g., high awareness of the left and right is high, low awareness of the rear, and the like), a preference of a driving operation (e.g., overtaking, lane change, and the like are not preferred), and the like. The processor 110 may be configured to acquire the driving characteristics of the operator from information obtained from the monitor camera (e.g., a line of sight, a direction of the face, and the like), for example. Alternatively, data for managing the driving characteristics of the operator may be stored in the storage device 120.

In the third embodiment, the processor 110 selects, as the one or more target control functions, a control function determined to be less necessary for the driving characteristics of the operator among the plurality of control functions. For example, when the operator does not like to overtake, "overtake low-speed vehicle" is considered to be less necessary. Thus, in this case, the processor 110 selects "overtake low-speed vehicle" as the one or more target control functions, for example. The processor 110 may be configured to select the one or more target control functions using an array that defines control functions necessary for the driving characteristics of the operator, for example.

According to the third embodiment, the data amount of the log data LOG can be reduced while suppressing an increase in the burden on the operator.

The above embodiments can also be combined. For example, the processor 110 may select the one or more target control functions using both the size of the generated data amount and the necessity in the traveling environment of the vehicle 1 as indicators.

Figure 5:
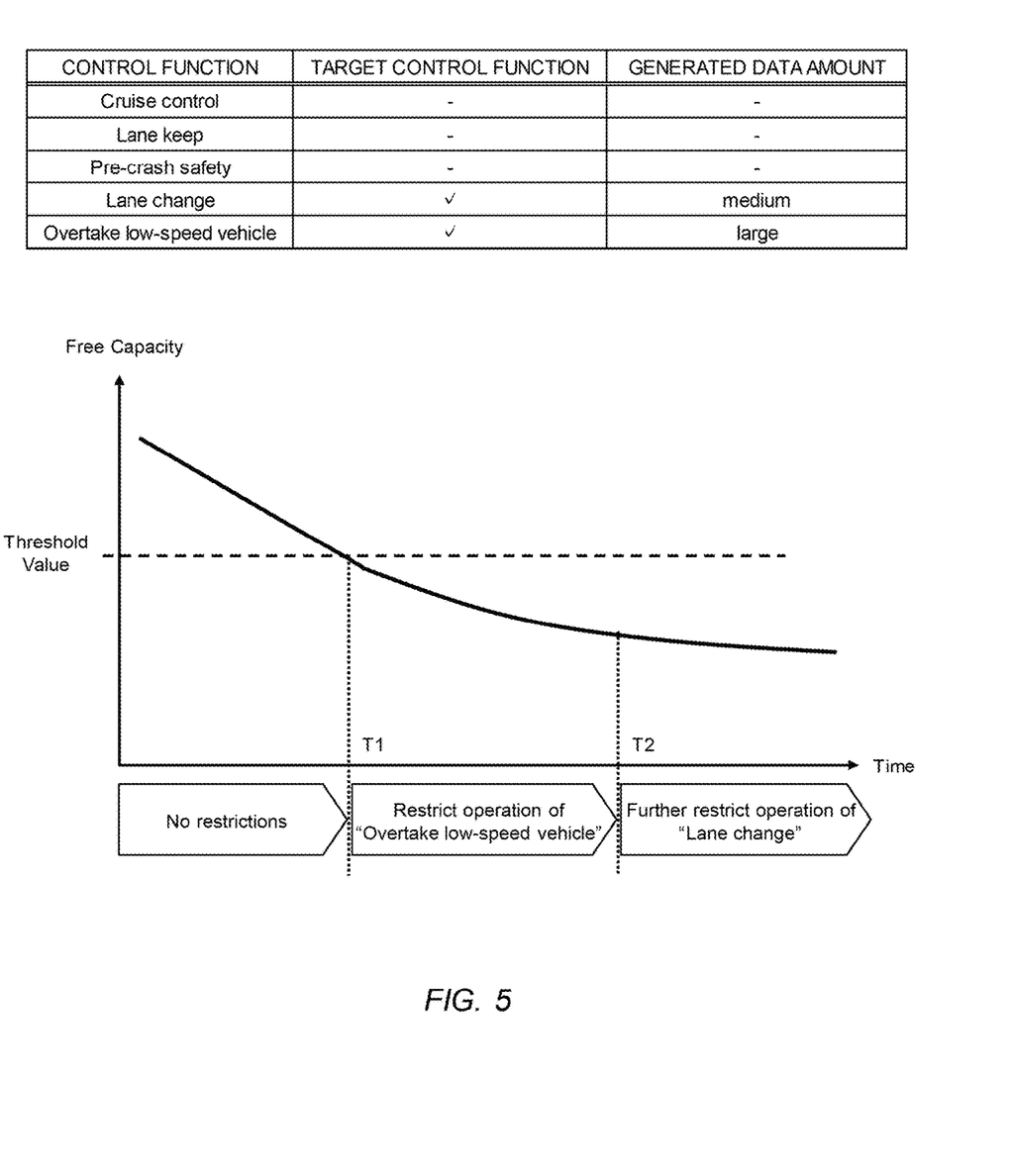
FIG. 5 is a diagram showing an practical example in which the operation of one or more target control functions is limited in stages depending on the free capacity.

2-3. Restricting Operation of Target Control Function Depending on Free Capacity The processor 110 may be configured to restrict the operation of the selected one or more target control functions in a stepwise manner depending on the free capacity of the storage device 120. In particular, the processor 110 may be configured to restrict the operation in order from the control function with the largest generated data amount among the one or more target control functions as the free capacity decreases.

FIG. 5 is a diagram showing a practical example of restricting the operation in order from the control function with the largest generated data amount. FIG. 5 shows a case where "lane change" and "overtake low-speed vehicle" are selected as the one or more target control functions. Further, the generated data amount related to "overtake low-speed vehicle" is larger than the generated data amount related to "lane change". At this time, as shown in FIG. 5, the processor 110 may be configured to restrict the operation of "overtake low-speed vehicle" at the time T1 when the free capacity becomes less than the threshold value, and further restrict the operation of "lane change" at the time T2 when the free capacity has further decreased.

By restricting the operation of the one or more target control functions in a stepwise manner depending on the free capacity in this way, the control function can be maintained to the extent that the free capacity can be suppressed from being strained.

The processor 110 may restrict the operation of one target control function in a stepwise manner. For example, if "lane change" is selected as the one or more target control functions, the processor 110 may be configured to first reduce the operation frequency of "lane change" when the free capacity is less than the threshold value, and then turn off the operation of "lane change" when the free capacity has further decreased.

3. Effect

As described above, according to the present embodiment, when the free capacity of the storage device 120 is less than the predetermined threshold value, the operation of the one or more target control functions selected from the plurality of control functions is restricted. This makes it possible to reduce the data amount of the log data LOG to be collected and stored. As a result, it is possible to suppress the capacity of the storage device 120 from being strained.

4. Other Control Systems

The present embodiment can also be applied to other control systems installed in the vehicle 1. For example, a driving support system is an example of one of other control system that perform vehicle control including a plurality of control functions. The driving support system is a system that performs vehicle control including control functions such as "automated emergency braking", "inter-vehicle distance control", "lane keep", "traffic sign recognition", and the like. Similarly to the present embodiment, when applied to the driving support system, the operation of the one or more target control functions selected from the plurality of control functions is restricted when the free capacity of the storage device 120 is less than a predetermined threshold value. This makes it possible to achieve the same effects as that described above.

What is claimed is:

1. A control system comprising:
    processing circuitry configured to perform vehicle control of a vehicle including a plurality of control functions; and
    one or more storage devices,
    wherein the processing circuitry is further configured to execute:
        storing log data related to the vehicle control in the one or more storage devices while performing the vehicle control; and
        when a free capacity of the one or more storage devices is less than a threshold value, restricting operation of one or more target control functions selected from the plurality of control functions, and
    wherein the processing circuitry is, in the execution of restricting operation of the one or more target control functions, configured to:
        acquire a generated data amount for each of the plurality of control functions, the generated data amount being a data amount of the log data generated per unit time; and
        select the one or more target control functions based on the generated data amount.

2. The control system according to claim 1, wherein the processing circuitry is, in the execution of restricting operation of the one or more target control functions, configured to restrict operation of the one or more target control functions in order of a control function with the largest amount of the generated data amount as the free capacity decreases.

* * * * *